(12) United States Patent
You-Hong

(10) Patent No.: US 9,360,313 B2
(45) Date of Patent: Jun. 7, 2016

(54) COMPASS AND CLINOMETER APPARATUS HAVING THE COMPASS

(71) Applicant: KOREA INSTITUTE OF GEOSCIENCE AND MINERAL RESOURCES, Daejeon (KR)

(72) Inventor: Kihm You-Hong, Daejeon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 182 days.

(21) Appl. No.: 13/931,230

(22) Filed: Jun. 28, 2013

(65) Prior Publication Data

US 2014/0101951 A1    Apr. 17, 2014

(30) Foreign Application Priority Data

Jul. 2, 2012    (KR) ........................ 10-2012-0071685

(51) Int. Cl.
  G01C 17/06    (2006.01)
  G01C 9/02    (2006.01)
  G01C 17/00    (2006.01)
  G01C 9/34    (2006.01)
  G01C 17/16    (2006.01)

(52) U.S. Cl.
  CPC .. *G01C 9/02* (2013.01); *G01C 9/34* (2013.01); *G01C 17/00* (2013.01); *G01C 17/06* (2013.01); *G01C 17/16* (2013.01)

(58) Field of Classification Search
  CPC ........... G01C 9/02; G01C 17/00; G01C 17/06
  USPC ................................................ 33/354, 355 R
  See application file for complete search history.

(56) References Cited

U.S. PATENT DOCUMENTS

| | | | | |
|---|---|---|---|---|
| 2,019,411 A | * | 10/1935 | Hassel | 33/364 |
| 2,822,618 A | * | 2/1958 | Wendel | 33/273 |
| 3,191,306 A | * | 6/1965 | De Valera Kierans | 33/273 |
| 4,110,914 A | * | 9/1978 | Ruder | G01C 17/06 33/355 D |
| 4,438,568 A | * | 3/1984 | Kramer et al. | 33/348 |
| 4,485,825 A | * | 12/1984 | Domjan et al. | 600/587 |
| 4,506,950 A | * | 3/1985 | Crossman | G01C 17/04 359/801 |
| 4,700,490 A | * | 10/1987 | Kramer et al. | 33/355 D |
| 6,357,128 B1 | * | 3/2002 | Iden | 33/348 |
| 6,516,526 B1 | * | 2/2003 | Iden | 33/355 R |
| 6,701,631 B1 | * | 3/2004 | Monteiro et al. | 33/1 E |
| 7,134,213 B1 | * | 11/2006 | Ashin | 33/355 R |
| 8,322,041 B1 | * | 12/2012 | Iden | 33/351 |
| 2003/0167646 A1 | * | 9/2003 | Lin | 33/391 |

FOREIGN PATENT DOCUMENTS

| | | |
|---|---|---|
| JP | 75/080458 | 7/1975 |
| JP | 83/215502 | 12/1983 |
| KR | 20-2009-0000583 | 1/2009 |

OTHER PUBLICATIONS

Breithaupt "COCLA" Stratum Compass. Item Specifications [online]. Western Technical Supply Co. Ltd., 2008 [retrieved on May 7, 2015]. Retrieved from the Internet: <URL:http://www.http://westerntechnical.com/acatalog/Breithaupt_Kassel_COCLA_Compass.html>.*

* cited by examiner

*Primary Examiner* — Christopher Fulton
(74) *Attorney, Agent, or Firm* — Norton Rose Fulbright US LLP

(57) ABSTRACT

A compass includes a case, a first support shaft, a second support shaft, and a needle. The case includes an upper plate, a lower plate, and a side wall that connects edge portions of the upper plate and the lower plate. The first support shaft is coupled to the lower plate and protrudes toward the upper plate, and the second support shaft is coupled to the upper plate and protrudes toward the lower plate. The needle includes a support unit, a first indicator unit, and a second indicator unit. The support unit is disposed between the first support shaft and the second support shaft, and includes a first support groove that is formed close to the first support shaft and a second support groove that is formed close to the second support shaft. The first indicator unit is coupled to one side of the support unit, and the second indicator unit is coupled to the support unit to face the first indicator unit with the support unit therebetween.

6 Claims, 2 Drawing Sheets

COMPASS AND CLINOMETER APPARATUS HAVING THE COMPASS

CROSS-REFERENCE TO RELATED APPLICATION

This application claims priority to and the benefit of Korean Patent Application No. 10-2012-0071685, filed on Jul. 2, 2012, the disclosure of which is incorporated herein by reference in its entirety.

BACKGROUND

1. Field of the Invention

The present invention relates to a compass and a clinometer apparatus including the same, and more particularly, to a compass that can measure a direction and a clinometer apparatus including the compass.

2. Discussion of Related Art

In general, a direction of a line of intersection between a bedding plane and a horizontal plane is called a strike, and an angle between the bedding plane and the horizontal plane is called a dip. A clinometer apparatus may be used in order to measure the strike and the dip.

In general, a conventional clinometer apparatus includes a level that determines whether the clinometer apparatus is horizontal and a compass that measures a strike.

The conventional clinometer apparatus is configured such that the compass and the level are exposed through only one side of a main body. That is, states of the level and the compass may be observed with the eyes from a top surface of the conventional clinometer apparatus, and may not be observed with the eyes from a bottom surface of the conventional clinometer apparatus.

Accordingly, when a dip and a strike of a bedding plane are measured below an observer's eye level, the dip and the strike may be measured while observing states of the level and the compass with the eyes. However, when the dip and the strike of the bedding plane are measured above the observer's eye level, since the conventional clinometer apparatus has to be located at a position higher than the observer's eye level, the observer views only the bottom surface, not the top surface, of the conventional clinometer apparatus. That is, when the conventional clinometer apparatus is located at a position higher than the observer's eye level, since states of the level and the compass of the conventional clinometer apparatus may not be observed with the eyes, it is difficult to measure the dip and the strike of the bedding plane whose position is higher than the observer's height.

SUMMARY OF THE INVENTION

The present invention is directed to a clinometer apparatus that may be used irrespective of whether the clinometer apparatus is located such that a top surface or a bottom surface is viewed.

According to an aspect of the present invention, there is provided a compass including a case that is transparent and has an inner space; a first support shaft that is provided in the inner space of the case to be coupled to a central portion of a lower plate of the case and extend toward an upper plate of the case; a second support shaft that is provided in the inner space of the case to be coupled to a central portion of the upper plate of the case and extend toward the lower plate of the case; and a needle including a support unit that is formed at a central portion of the needle and includes a first support groove and a second support groove that are formed to be directed in opposite directions, wherein the first support groove may be supported by the first support shaft when the compass is located such that the upper plate of the case is disposed over the lower plate and the second support groove may be supported by the second support shaft when the compass is located such that the lower plate of the case is disposed over the upper plate.

According to another aspect of the present invention, there is provided a clinometer apparatus including the compass: a base plate that includes a first opening in which the compass is received, a second opening that is disposed at one side of the first opening and extends in a transverse direction, and a third opening that is disposed at another side of the first opening and extends in a longitudinal direction ; a first level that is inserted into the second opening; a second level that is inserted into the third opening; a first transparent plate that covers a top surface of the base plate; and a second transparent plate that covers a bottom surface of the base plate.

The clinometer apparatus may further include first and second direction display sheets that are respectively attached to the top surface and the bottom surface of the base plate to be disposed around an edge of the first opening and on which direction indices are printed.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
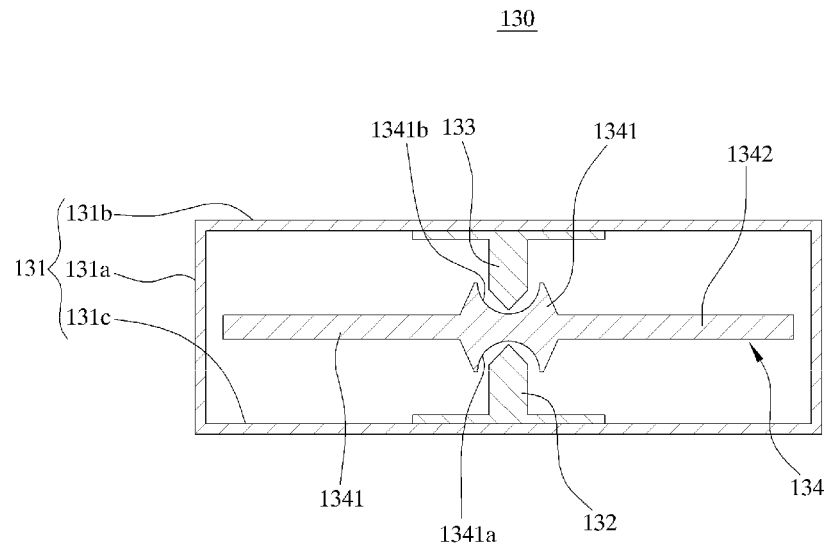
FIG. 1 is a cross-sectional view illustrating a compass according to an embodiment of the present invention.

The present invention will now be described more fully with reference to the accompanying drawings, in which exemplary embodiments of the present invention are shown. It should be understood, however, that there is no intent to limit exemplary embodiments of the present invention to the particular forms disclosed, but conversely, exemplary embodiments of the present invention are to cover all modifications, equivalents, and alternatives falling within the spirit and scope of the present invention. Like reference numerals denote like elements in the drawings. In the attached drawings, sizes of structures may be exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising,"

"includes," and/or "including," when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

<Compass>

FIG. 1 is a cross-sectional view illustrating a compass 130 according to an embodiment of the present invention.

Referring to FIG. 1, the compass 130 may include a case 131, a first support shaft 132, a second support shaft 133, and a needle 134.

The case 131 has an inner space in which the first support shaft 132, the second support shaft 133, and the needle 134 are received. For example, the case 131 may include a side wall 131a that has a cylindrical pipe shape, an upper plate 131b that covers an upper opening of the side wall 131a, and a lower plate 131c that covers a lower opening of the side wall 131a, and each of the upper plate 131b and the lower plate 131c may be formed of a transparent material so that the needle 134 received in the inner space may be observed from both surfaces outside the case 131. For example, each of the upper plate 131b and the lower plate 131c may be formed of a transparent synthetic resin or transparent tempered glass.

The first support shaft 132 and the second support shaft 133 support the needle 134 such that the needle 134 may freely rotate. The first support shaft 132 may be coupled to a central portion of the lower plate 131c of case 110, and the second support shaft 133 may be coupled to a central portion of the upper plate 131b of case 110. The first support shaft 132 may extend from the lower plate 131c of case 110 toward the upper plate 131b, and the second support shaft 133 may extend from the upper plate 131b toward the lower plate 131c. The first support shaft 132 and the second support shaft 133 may be disposed on a central axis of the case 110, and an end portion of the first support shaft 132 and an end portion of the second support shaft 133 may be spaced apart by a predetermined interval from each other.

The needle 134 may be disposed between the first support shaft 132 and the second support shaft 133 to freely rotate. The needle 134 may include a support unit 1341, a first indicator unit 1342, and a second indicator unit 1343. The support unit 1341 may include a first support groove 1341a that is formed in a bottom surface of the support unit 1341, and a second support groove 1341b that is formed in a top surface of the support unit 1341. The first support groove 1341a and the second support groove 1341b may be formed to be headed in opposite directions about the central axis of the case 131. Accordingly, the first support groove 1341a may be supported by the first support shaft 132, and the second support groove 1341b may be supported by the second support shaft 133. The first indicator unit 1342 and the second indicator unit 1343 are coupled to the support unit 1341 to be located on a virtual straight line with the support unit 1341 therebetween. For example, the first indicator unit 1342 may be coupled to one side surface of the support unit 1341, and the second indicator unit 1343 may be coupled to the other side surface of the support unit 1341 facing the one side surface.

When the compass 130 is located such that the upper plate 131b of the case 131 is disposed over the lower plate 131c, the first support groove 1341a of the support unit 1341 may be supported by the first support shaft 132, and when the compass 130 is located such that the lower plate 131c of the case 131 is disposed over the upper plate 131b, the second support groove 1341b of the support unit 1341 may be supported by the second support shaft 133. Accordingly, the compass 130 may effectively display a direction when the compass 130 is located in any direction.

<Clinometer Apparatus>

Figure 2:
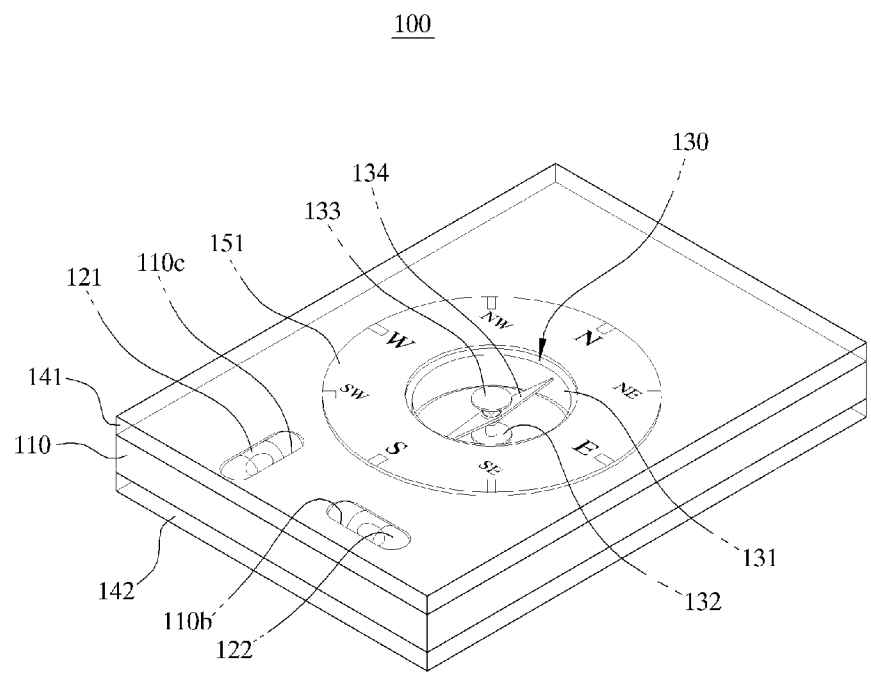
FIG. 2 is a perspective view illustrating a clinometer apparatus according to an embodiment of the present invention.
Figure 3:
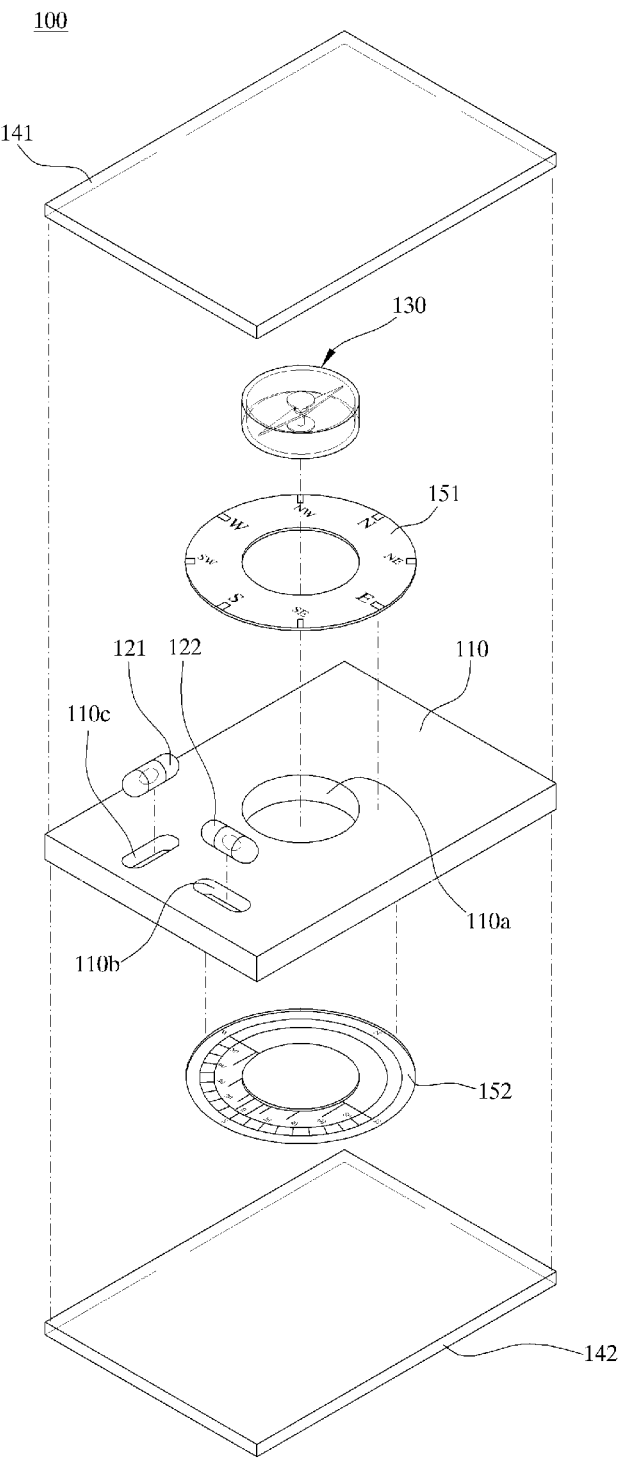
FIG. 3 is an exploded perspective view of the clinometer apparatus illustrated in FIG. 2.

FIG. 2 is a perspective view illustrating a clinometer apparatus 100 according to an embodiment of the present invention. FIG. 3 is an exploded perspective view illustrating the clinometer apparatus 100 of FIG. 2.

Referring to FIGS. 2 and 3, the clinometer apparatus 100 includes a base plate 110, a first level 121, a second level 122, and the compass 130.

The base plate 110 may have any of various plate shapes. For example, the base plate 110 may have a quadrangular plate shape. The base plate 110 may be formed of a plastic material or a metal material. The first level 121, the second level 122, and the compass 130 are provided on the base plate 110. For example, the base plate 110 may include a plurality of openings, for example, first through third openings 110a, 110b, and 110c for receiving the first level 121, the second level 122, and the compass 130. The first opening 110a may be formed in a central portion of the base plate 110 to have a size great enough to receive the compass 130. The second opening 110b and the third opening 110c may be formed to be spaced apart from the first opening 110a, and may respectively receive the first level 121 and the second level 122. For example, the second opening 110b may extend in a transverse direction of the base plate 110, and the third opening 110c may extend in a longitudinal direction of the base plate 110.

The first level 121 and the second level 122 may determine whether the base plate 110 is horizontal. Each of the first level 121 and the second level 122 may be configured by filling liquid in a transparent tube in which bubbles are present. The first level 121 may be forced to be inserted into and fixed to the second opening 110b of the base plate 110, and the second level 122 may be forced to be inserted into and fixed to the third opening 110c of the base plate 110. The first level 121 may determine whether the base plate 110 is horizontal in the transverse direction, and the second level 122 may determine whether the base plate 110 is horizontal in the longitudinal direction.

The compass 130 is forced to be inserted into and fixed to the first opening 110a of the base plate 110. A detailed structure of the compass 130 has been explained with reference to FIG. 1, and thus a detailed explanation thereof will not be given.

Referring back to FIG. 2, in the present embodiment, the clinometer apparatus 100 may further include a first transparent plate 141 and a second transparent plate 142. The first transparent plate 141 and the second transparent plate 142 respectively cover a top surface and a bottom surface of the base plate 110. For example, the first transparent plate 141 may be attached to the top surface of the base plate 110, and the second transparent plate 142 may be attached to the bottom surface of the base plate 110. Each of the first transparent plate 141 and the second transparent plate 142 may have any of various plate shapes. For example, each of the first transparent plate 141 and the second transparent plate 142 may have a quadrangular plate shape. Each of the first transparent plate 141 and the second transparent plate 142 may be formed of a transparent resin or transparent tempered glass. In order to protect the base plate 110, in an embodiment, each of the first transparent plate 141 and the second transparent plate 142 may have the same size as that of the base plate 110. In another embodiment, although not shown, an edge unit may be formed around end portions of the base plate 110 in four directions to be bent toward the base plate 110 and surround a thickness surface of the base plate 110.

Referring back to FIG. 2, in the present embodiment, the clinometer apparatus 100 may further include a first direction display sheet 151 and a second direction display sheet 152. Direction indices may be printed on surfaces of the first direction display sheet 151 and the second direction display sheet 152. The first direction display sheet 151 may be disposed between the base plate 110 and the first transparent plate 141, and the second direction display sheet 152 may be disposed between the base plate 110 and the second transparent plate 142. For example, the first direction display sheet 151 may be attached around an edge of the first opening 110a on the top surface of the base plate 110, and the second direction display sheet 152 may be attached around an edge of the first opening 110a on the bottom surface of the base plate 110. Accordingly, since the first direction display sheet 151 and the second direction display sheet 152 are disposed around the compass 130, the needle 134 of the compass 130 may indicate any of the direction indices printed on the first direction display sheet 151 and the second direction display sheet 152 while rotating.

When a strike and a dip of a bedding plane are measured using the clinometer apparatus 100 according to the present embodiment, since both a top surface and a bottom surface of the clinometer apparatus 100 are transparent, the first support groove 1341a that is formed in the bottom surface of the support unit 1341 of the needle 134 of the compass 130 may be supported by the first support shaft 132, and the second support groove 1341b that is formed in the top surface of the support unit 1341 may be supported by the second support shaft 133, the needle 134 may freely rotate, and states of the first and second levels 121 and 122 and the compass 130 may be observed irrespective of whether the clinometer apparatus 100 is located such that the top surface or the bottom surface is viewed. Accordingly, the strike may be rapidly measured without changing a direction of the clinometer apparatus 100. Assuming that a point at which a dip and a strike are to be measured is higher than an observer's eye level, even when the clinometer apparatus 100 is located at a position higher than the observer's eye level, since states of the first level 121, the second level 122, and the compass 130 may be observed with the eyes from the bottom surface of the clinometer apparatus 100, the dip and the strike of the bedding plane whose position is higher than the observer's height may be measured.

According a compass and a clinometer apparatus including the same of the present invention, a needle of the compass may freely rotate irrespective of whether the clinometer apparatus is located such that a top surface or a bottom surface is viewed, and states of a level and the compass may be observed from both the top surface and the bottom surface. Accordingly, a strike and a dip of a bedding plane may be rapidly measured without considering a direction of the clinometer apparatus, and a strike and a dip of a bedding plane whose position is higher than an observer's height may be measured.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A compass comprising:
   a case that comprises a transparent upper plate, a transparent lower plate that faces the upper plate, and a side wall that connects edge portions of the upper plate and the lower plate;
   a first support shaft that is coupled to the lower plate and protrudes toward the upper plate to have a first pointed distal end;
   a second support shaft that is coupled to the upper plate and protrudes toward the lower plate to have a second pointed distal end; and
   a needle comprising a support unit that is disposed between the first support shaft and the second support shaft and comprises a first support groove that is formed close to the first support shaft and a second support groove that is formed close to the second support shaft, a first indicator unit that is coupled to one side of the support unit, and a second indicator unit that is coupled to the support unit to face the first indicator unit with the support unit therebetween,
   wherein with respect to a plane disposed between the first pointed distal end and the second pointed distal end, the first support shaft is symmetrical to the second support shaft and the first support groove is symmetrical to the second support groove.

2. The compass of claim 1, wherein the first pointed distal end of the first support shaft is received in the first support groove, and the second pointed distal end of the second support shaft is received in the second support groove.

3. The compass of claim 1, wherein the first and second pointed distal ends and central portions of the first and second support grooves are located on a same virtual axis, and an interval between the first pointed distal end and the second pointed distal end is greater than a thickness of the support unit between the central portion of the first support groove and the central portion of the second support groove.

4. A clinometer apparatus comprising:
   a base plate that has a first opening passing through a central portion of the base plate;
   a compass that is inserted into and fixed to the first opening;
   a first transparent plate that covers a top surface of the base plate;
   a second transparent plate that covers a bottom surface of the base plate;
   a first direction display sheet that is disposed between the base plate and the first transparent plate and on which first direction indices formed around an edge of the first opening are printed; and
   a second direction display sheet that is disposed between the base plate and the second transparent plate and on which second direction indices formed around an edge of the first opening are printed,
   wherein the compass comprises:
   a case that is inserted into the first opening and comprises a side wall that has a cylindrical pipe shape, an upper plate that is transparent and covers an upper opening of the side wall, and a lower plate that is transparent and covers a lower opening of the side wall;
   a first support shaft that is coupled to the lower plate and protrudes toward the upper plate;
   a second support shaft that is coupled to the upper plate and protrudes toward the lower plate; and a needle comprising a support unit that is disposed between the first support shaft and the second support shaft and comprises a first support groove that is formed close to the first support shaft and a second support groove that is formed close to the second support shaft, a first indicator unit that is coupled to one side of the support unit, and a second indicator unit that is coupled to the support unit to face the first indicator unit with the support unit therebetween, wherein with respect to a plane disposed between the first pointed distal end and the second pointed distal end, the first support shaft is symmetrical to the second support shaft and the first support groove is symmetrical to the second support groove.

5. The clinometer apparatus of claim 4, wherein the first pointed distal end is received in the first support groove, and the second pointed distal end is received in the second support groove.

6. The clinometer apparatus of claim 4, wherein the base plate further comprises:

a second opening that is spaced apart from the first opening and extends in a first direction; and a third opening that is spaced apart from the first opening and extends in a second direction that crosses the first direction, wherein the clinometer apparatus further comprises:

a first level that is inserted into and fixed to the second opening; and a second level that is inserted into and fixed to the third opening.

* * * * *